Oct. 4, 1949.  J. U. WHITE  2,483,746
OPTICAL APPARATUS UTILIZING LIGHT OF
A WAVE LENGTH ABOVE A SELECTED VALUE
Filed July 19, 1946  2 Sheets-Sheet 1
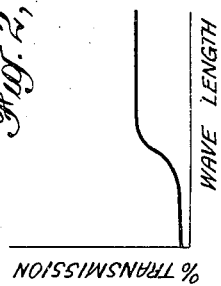
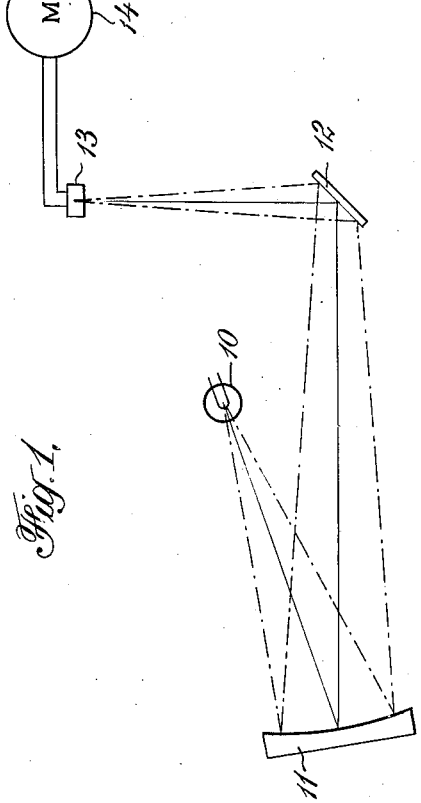
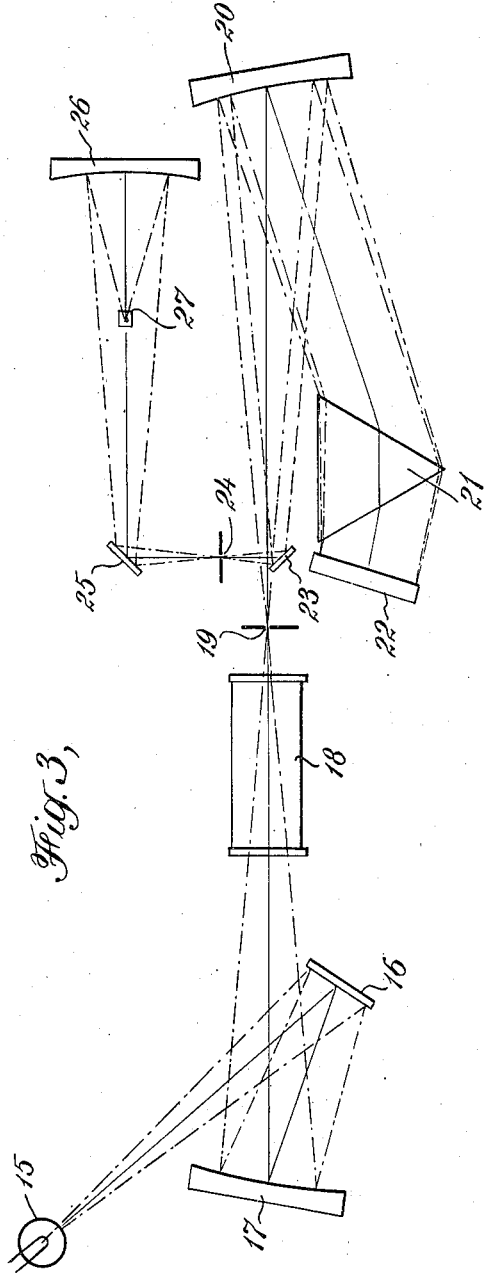
INVENTOR
John U. White
BY
Pennie Edmonds Morton Barrows
ATTORNEYS

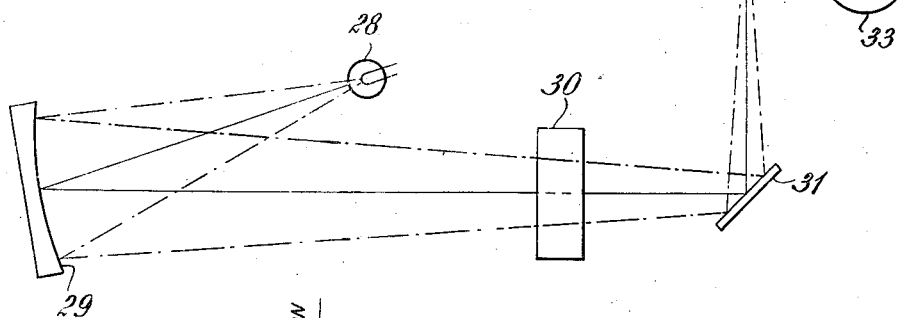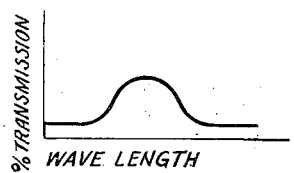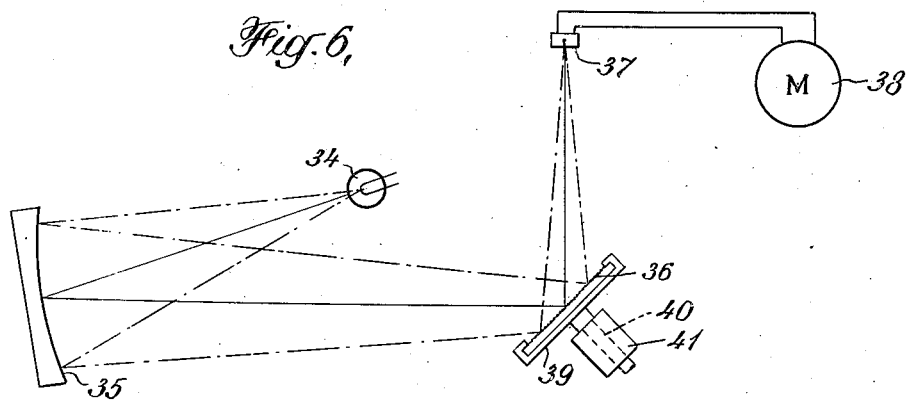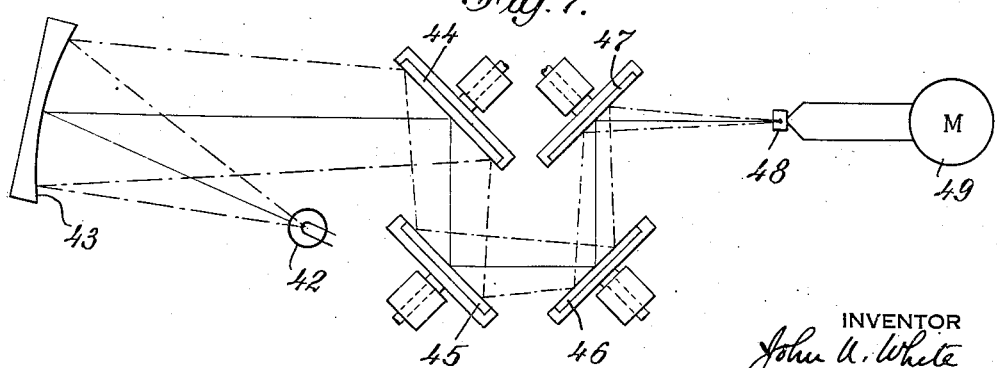

Patented Oct. 4, 1949

2,483,746

UNITED STATES PATENT OFFICE 2,483,746

OPTICAL APPARATUS UTILIZING LIGHT OF A WAVE LENGTH ABOVE A SELECTED VALUE

John U. White, Darien, Conn., assignor to The Perkin-Elmer Corporation, Glenbrook, Conn., a corporation of New York Application July 19, 1946, Serial No. 684,747

4 Claims. (Cl. 250—43)

This invention relates to devices for the filtration of light and is concerned more particularly with a novel device for producing a light beam, from which light of substantially all wave lengths below a selected value has been eliminated. The new device may be incorporated in instruments of various kinds, in which it is desirable to make use of light of relatively long wave lengths or of wave lengths between selected limits only, and it may be utilized to especial advantage in infrared spectrometers, since it effects a large reduction in scattered light.

Infrared spectrometers, such as are now used for chemical analysis, must have high photometric accuracy and high spectral purity and, heretofore, these characteristics have been obtained only by using large, high aperture optics to give high light intensities and excellent optical surfaces to give high resolution and low scattered light. However, even with the best optical parts obtainable the errors arising from scattered light becomes appreciable in such instruments, when they are operated at wave lengths longer than about $6\mu$, and, since there is a lack of transparent selective filters, which are effective to eliminate the scattered radiation, it is extremely difficult to get rid of such radiation except by the use of an expensive double monochromator. When a double monochromator is employed, the instrument may be used to examine narrow bands of wave lengths of great spectral purity, but inspection of each such band requires adjustment of both monochromators and this makes use of the instrument laborious and time consuming.

In some instruments, such as gas analyzers, it may be desirable to use an infrared beam containing a wide band of long wave lengths only and, in that case, the short wave length radiation masks the effect to be examined. Elimination of the short wave length radiation is extremely difficult, since the ordinary source of infrared radiation produces many times more radiation of short wave length than of long. Moreover, monochromators are not useful for removing the short wave length radiation, because they make available a narrow rather than the desired wide band of wave lengths.

The present invention is, accordingly, directed to the provision of a device, which produces a light beam containing substantially no light of wave lengths shorter than a predetermined or selected value, and the device includes a light source, and filter means which remove the light of undesired wave lengths. The filtering means used is a diffraction grating, which may either transmit or reflect, and is of the echelette type and concentrates in the diffracted spectra a large percentage of the light of wave lengths shorter than the grating space.

As is well known, when light falls upon a grating, some of it is diffracted out of its normal direction into the different spectral orders, and the distribution of the different colors may be calculated on the assumption that each ruling on the grating acts as a small prism set to emit light at a given angle. The diffraction effect referred to occurs only at wave lengths shorter than the grating space and no diffraction is possible at wave lengths substantially longer than the grating space, since the equation for calculation of the distribution predicts that a diffracted ray of light of a wave length longer than the grating space would go in an imaginary direction. An echelette grating concentrates the light in the diffracted spectra so that, when white light falls on such a grating, only a small amount of light of wave lengths shorter than the grating space is left in the zero order undiffracted energy. The result is that the undiffracted beam from such a grating contains all the light of wave lengths substantially longer than the grating space and only a very small amount of light of wave lengths shorter than the grating space. The diffracted spectra of the first, second, and higher orders are spread out by the grating over wide angular ranges, and the light therein can, accordingly, be readily separated from the useful beam. The wave length at which the cut-off occurs is determined by both the grating space and the angle of incidence of the light thereon, and the grating employed in the device of the invention is accordingly selected and mounted in view of the purpose for which the device is to be used.

The use of the new device is particularly desirable in spectrometers in which scattered light impairs accuracy or is otherwise troublesome. As scattering depends on wave length and is proportional to the reciprocal of the fourth power of the wave length, the elimination of short wave length light from the useful beam produced by the new device effects a reduction in scattered light and, in an infrared spectrometer, it has been found possible by the use of a grating of the appropriate number of lines to reduce the scattered light to a small value.

For a better understanding of the invention, reference may be had to the accompanying drawings in which:

Fig. 1 illustrates diagrammatically a simple form of the essential features of the new device;

Fig. 2 is a diagram showing a transmission curve of the grating for the zero order spectrum;

Fig. 3 is a diagrammatic view showing the use of the new device in an infrared spectrometer;

Fig. 4 is a diagrammatic view illustrating a form of the new device which includes a filter, the device producing a beam containing light of wave lengths between upper and lower limits only;

Fig. 5 is a diagram showing a transmission curve of the grating and filter combination of Fig. 4;

Fig. 6 is a diagrammatic view illustrating a device in which the grating is adjustably mounted in order that the angle of incidence of the light may be varied; and Fig. 7 is a diagrammatic view of a form of the device, in which a plurality of gratings are employed in order that the cut-off may be sharpened The essential features of the new device are illustrated in Fig. 1, and include a light source 10 which may be of any suitable type and, in the case of an infrared spectrometer, is generally a form of Carborundum rod heated by the passage of current through it. The light from the source may be and preferably is concentrated by appropriate means, such as a focusing mirror 11, upon the surface of a reflection grating 12 of the echelette type, and passes therefrom to a detector 13. When a beam of infrared light is being produced, the detector may be a thermocouple or bolometer, and the detector is connected to the usual indicating meter 14.

The transmission curve of the grating for the zero order spectrum is illustrated in Fig. 2, and the curve shows that the grating greatly reduces the amount of light of wave lengths substantially shorter than the grating space. In actual practice, it has been found that a grating of about 7500 lines per inch will pass 90% of the light at wave lengths of about $5\mu$ and above, about 45% of the light of about $4\mu$, and about 20% of the light of about $3\mu$. Thus, with such a grating, about 80% of the light of a wave length of $3\mu$ and under is eliminated and less amounts of light of wave lengths between $3\mu$ and $5\mu$. A grating of about 3600 lines per inch will give a comparable cut-off at about $10\mu$. The values of cut-off depend on the angle of incidence and those given are for an angle of about 15°. The smaller the angle of incidence, the lower the cut-off wave lengths. For example, a 3600 line grating will pass about 90% of the light at wave lengths of about $11\mu$ and above with an angle of incidence of 24°, and, with an angle of 45°, the grating will pass about the same proportion of light of wave lengths of about $12.5\mu$ and above.

In Fig. 3 there is illustrated the light path in an infrared spectrometer, in which the new device is employed. The device includes a source 15 in the form of a Carborundum rod, from which the light passes to a flat mirror 16 and thence to a spherical mirror 17, which focuses the light through the cell 18 containing the sample to be studied upon an entrance slit 19. The portion of the beam passing through the slit is collimated by an off-axis paraboloid 20 and passes through a prism 21 to be dispersed, and thence to an adjustable flat mirror 22. The light from the mirror returns through the prism, to be again dispersed thereby, to the paraboloid 20 from which it passes to a flat mirror 23, which brings it to a focus in a spectrum that falls across the exit slit 24. The rays passing through the exit slit strike an echelette grating 25 and pass therefrom to a focusing mirror 26, by which the rays are focused upon a detector 27, which may be a thermocouple connected to a galvanometer (not shown). In the instrument, the grating acts to remove a major proportion of scattered light of wave lengths substantially shorter than the grating space and higher order spectra of such light. By adjustment of mirror 26, light in narrow bands of wave lengths throughout the spectrum produced by prism 21 may be directed upon detector 27. In the arrangement shown, a grating of 3600 lines per inch has been found to be effective to reduce the scattered light by factors between 11 and 15 in the range between $10\mu$ and $15\mu$, in which range this grating is particularly effective.

For some purposes, it may be desirable to produce a light beam containing light of wave lengths between upper and lower limits only, and a form of the new device suitable for this purpose is illustrated in Fig. 4. The device includes a light source 28 and a mirror 29 focusing the light upon a filter 30, which transmits light of wave lengths below a selected value only. From the filter, the beam, now containing only light of wave lengths below an upper limit determined by the filter, passes to an echelette grating 31, from which the light passes to a detector 32 connected to an indicating meter 33. As the grating removes from the beam a major proportion of the light of wave lengths shorter than the grating space, the transmission curve for the combination of the filter and grating is of the general form shown in Fig. 5.

In Fig. 6, there is illustrated a form of the new device, in which the echelette grating is adjustably mounted so that the angle of incidence of the light thereon, and, therefore, the wave length of cut-off, may be changed without changing the positions of the other optical parts. The device includes a source 34, a mirror 35 receiving light from the source, and a grating 36, upon which the light is focused by the mirror. From the grating, the light passes to a detector 37 connected to an indicating meter 38. The grating is supported in an adjustable mounting, which includes a holder 39 for the grating, a shaft 40 attached to the holder and extending normal to the plane of the grating, and a bearing 41 for the shaft. Means (not shown) are provided for rotating the shaft through very small arcs and such rotation alters the aspect of the lines of the grating to the oncoming light and thereby changes the angle of incidence and the cut-off wave length.

As pointed out above, a grating of the echelette type concentrates in the diffracted spectra, a large part, but not all, of the light of wave lengths shorter than the grating space. The sharpness of cut-off may, accordingly, be increased by using a plurality of like gratings in sequence, and a device, containing such a group of like gratings, is illustrated in Fig. 7. The device includes a source 42 and a mirror 43 for focusing the light upon a grating 44, which may have an adjustable mounting of the type shown in Fig. 6. From the grating 44, the light passes in sequence to gratings 45, 46, and 47 in adjustable mountings and the light from grating 47 strikes the detector 48 connected to an indicating meter 49. Each grating contributes toward the removal from the beam of light of wave lengths shorter than the grating space, and such an arrangement as is shown in Fig. 7 produces sharp cut-off at a wave length approximately equal to the grating space. The exact cut-off wave length depends on the orientation of the gratings, as made clear in the foregoing.

I claim:

1. In an instrument utilizing infrared light, from which it is desirable to eliminate light of all wave lengths below a selected wave length in the short infrared range, the combination of a source of infrared light, an echelette diffraction grating having an effective grating space approximately equal to said selected wave length, said grating passing into the diffracted spectra a major proportion of light of wave lengths shorter than the grating space, and a detector, the grating being mounted to receive light from said source and to direct the undiffracted light toward the detector and the diffracted light away from the detector.

2. In an instrument utilizing infrared light, from which it is desirable to eliminate light of all wave lengths below a selected wave length in the short infrared range, the combination of a source of infrared light, an echelette diffraction grating having an effective grating space approximately equal to said selected wave length, said grating passing into the diffracted spectra a major proportion of light of wave lengths shorter than the grating space, a detector, and means for directing light from the source upon the grating, the grating being mounted to receive light from the source and to direct the undiffracted light toward the detector and the diffracted light away from the detector.

3. In an instrument utilizing infrared light, from which it is desirable to eliminate light of all wave lengths below a selected wave length in the short infrared range, the combination of a source of infrared light, a vessel containing material to be studied, a detector, and means for directing light from the source through the vessel and upon the detector, said means including an echelette diffraction grating having an effective grating space approximately equal to said selected wave length, said grating passing into the diffracted spectra a major proportion of light of wave lengths shorter than the grating space and being mounted to receive light from the source and to direct the undiffracted light toward the detector and the diffracted light away from the detector.

4. In an instrument utilizing infrared light, from which it is desirable to eliminate light of all wave lengths below a selected wave length in the short infrared range, the combination of a source of infrared light, a vessel containing material to be studied, a detector, and means for directing light from the source through the vessel and passing to the detector a narrow band of wave lengths of light that has passed through the vessel, said means including an echelette diffraction grating having an effective grating space approximately equal to said selected wave length, said grating passing into the diffracted spectra a major proportion of light of wave lengths shorter than the grating space and being mounted to receive light from the source and to direct the undiffracted light toward the detector and the diffracted light away from the detector, a dispersing element receiving light that has passed through the vessel, and a slit upon which the dispersed light from the element is focused and through which a portion of the dispersed light passes toward the detector.

JOHN U. WHITE.

REFERENCES CITED

The following references are of record in the file of this patent:

UNITED STATES PATENTS

| Number | Name | Date |
| --- | --- | --- |
| 1,176,313 | Pfund | Mar. 21, 1916 |
| 2,269,674 | Liddel et al. | Jan. 13, 1942 |
| 2,314,800 | Pineo | Mar. 23, 1943 |
| 2,339,053 | Coleman | Jan. 11, 1944 |
| 2,404,064 | Heigl et al. | July 26, 1946 |

OTHER REFERENCES

"Physical Optics," by R. W. Wood, third edition, published 1936; pp. 265 and 266.

"Spectroscopy," by E. C. Baly, vol. 1, third edition, published 1924; pp. 231 and 232.